(12) United States Patent
Mizutani et al.

(10) Patent No.: US 11,969,987 B2
(45) Date of Patent: *Apr. 30, 2024

(54) CONTACTING MEMBER, DRYING DEVICE, AND PRINTING APPARATUS

(71) Applicants: Yuuki Mizutani, Kanagawa (JP); Tomohiro Tamai, Kanagawa (JP)

(72) Inventors: Yuuki Mizutani, Kanagawa (JP); Tomohiro Tamai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 347 days.

This patent is subject to a terminal disclaimer.

(21) Appl. No.: 17/431,188

(22) PCT Filed: Feb. 17, 2020

(86) PCT No.: PCT/JP2020/006109
§ 371 (c)(1),
(2) Date: Aug. 16, 2021

(87) PCT Pub. No.: WO2020/189135
PCT Pub. Date: Sep. 24, 2020

(65) Prior Publication Data
US 2022/0161577 A1     May 26, 2022

(30) Foreign Application Priority Data
Mar. 18, 2019   (JP) .................. 2019-050260

(51) Int. Cl.
*B32B 7/12* (2006.01)
*B32B 5/02* (2006.01)
(Continued)

(52) U.S. Cl.
CPC .................. *B32B 7/12* (2013.01); *B32B 5/02* (2013.01); *B41J 11/0024* (2021.01);
(Continued)

(58) Field of Classification Search
None
See application file for complete search history.

(56) References Cited

U.S. PATENT DOCUMENTS 6,090,902 A * 7/2000 Kuo ................. C08F 290/06
526/279
6,677,044 B2   1/2004 Araki et al.
(Continued)

FOREIGN PATENT DOCUMENTS

CN    1920694       2/2007
CN    203046392 U   7/2013
(Continued)

OTHER PUBLICATIONS

International Search Report dated May 29, 2020 in PCT/JP2020/006109 filed on Feb. 17, 2020.
(Continued)

*Primary Examiner* — Ramsey Zacharia
(74) *Attorney, Agent, or Firm* — Grüneberg and Myers PLLC

(57) ABSTRACT

A contacting member contacts a region of a contacted member to which a liquid composition has been applied. The contacting member has a substrate and a fluororesin fiber layer containing a fluororesin fiber. One side of the fluororesin fiber layer is directly or indirectly fixed to the substrate and another side of the fluororesin fiber layer contacts the contacted member. A ratio X/Y is less than 1.00, wherein X is a presence ratio of the fluororesin fiber in the fluororesin fiber layer on the side which is directly or indirectly fixed to the substrate and Y is a presence ratio of the fluororesin fiber in the fluororesin fiber layer on the other side which contacts the contacted member.

19 Claims, 10 Drawing Sheets

(51) Int. Cl.
  *B41J 11/00* (2006.01)
  *B41J 13/076* (2006.01)
  *B65H 27/00* (2006.01)

(52) U.S. Cl.
  CPC ............ *B41J 13/076* (2013.01); *B65H 27/00* (2013.01); *B32B 2250/02* (2013.01); *B32B 2260/021* (2013.01); *B32B 2262/02* (2013.01); *B32B 2307/554* (2013.01)

(56) References Cited

U.S. PATENT DOCUMENTS

| | | | |
|---|---|---|---|
| 11,660,887 B2 * | 5/2023 | Mizutani | B41J 11/002 347/102 |
| 2003/0162027 A1 | 8/2003 | Araki et al. | |
| 2007/0048046 A1 | 3/2007 | Tamemasa | |
| 2013/0021402 A1 * | 1/2013 | Tsuzawa | B41J 11/0022 347/16 |
| 2016/0114295 A1 | 4/2016 | Park et al. | |
| 2018/0257104 A1 | 9/2018 | Che et al. | |
| 2018/0264849 A1 | 9/2018 | Kitaoka et al. | |
| 2018/0319188 A1 | 11/2018 | Toyama et al. | |
| 2020/0141148 A1 | 5/2020 | Wakita et al. | |
| 2020/0290372 A1 | 9/2020 | Mizutani et al. | |

FOREIGN PATENT DOCUMENTS

| | | |
|---|---|---|
| CN | 108290432 | 7/2018 |
| CN | 108430779 | 8/2018 |
| JP | 10-010898 | 1/1998 |
| JP | 2000-227110 | 8/2000 |
| JP | 2009-037012 | 2/2009 |
| JP | 2011-051668 | 3/2011 |
| JP | 2014-156317 | 8/2014 |
| JP | 2016-088039 | 5/2016 |
| JP | 2017-094515 | 6/2017 |
| JP | 2017-213846 | 12/2017 |
| JP | 2018-154120 | 10/2018 |
| JP | 2018-178275 | 11/2018 |
| JP | 2018-189204 | 11/2018 |
| JP | 2019-163162 | 9/2019 |
| JP | 2020-148269 | 9/2020 |
| JP | 2020-152474 | 9/2020 |
| JP | 2020-185709 | 11/2020 |
| WO | 2018/074207 | 4/2018 |

OTHER PUBLICATIONS

Shigenori Kuga, et al., "Development and application of dynamic scanning absorptometer—Automation and improvement of Bristow measurement—" Japan Tappi Journal, vol. 48, 1994, No. 5, pp. 88-92.

Japanese Office Action dated Sep. 13, 2022, in Japanese Patent Application No. 2019-050260, with English translation, 9 pages.

Notice of Publication Submission Paper dated Aug. 30, 2022, in Japanese Patent Application No. 2019-050260, with English translation, 26 pages.

Notice of Submission of Publication dated Aug. 31, 2022, in Japanese Patent Application No. 2019-050260, with English translation, 2 pages.

Chinese Office Action dated Nov. 18, 2022, in Chinese Patent Application No. 202080020234.6, 8 pages.

\* cited by examiner

CONTACTING MEMBER, DRYING DEVICE, AND PRINTING APPARATUS

CROSS-REFERENCE TO RELATED APPLICATIONS

This application is the National Stage entry under § 371 of International Application No. PCT/JP2020/006109, filed on Feb. 17, 2020, and which claims the benefit of Japanese Application No. 2019-050260, filed on Mar. 18, 2019. The content of each of these applications is hereby incorporated by reference in its entirety.

TECHNICAL FIELD

The present disclosure relates to a contacting member, a drying device, and a printing apparatus.

BACKGROUND ART

In a printing apparatus such as an inkjet device, a conveyer for conveying a printing material (e.g., cut paper) is provided. The conveyer conveys the printing material to a liquid composition applicator that applies a liquid composition (e.g., inkjet ink) thereto, or a liquid composition heater that heats the applied liquid composition to dry. There are various types of conveyers, and a plurality of rollers arranged at intervals along the axial direction is often used.

However, among such conveyers, those which come into direct contact with a region to which the liquid composition has been applied may cause an undesired phenomenon in which the liquid composition is transferred to the conveyer.

Patent Literature 1 discloses a roller for feeding a printing material in a device having a printing function, which includes a rod-shaped core and a wire including an easily-lubricatable resin fiber that is spirally wound around an outer circumferential surface of the core. It is disclosed therein that the roller can smoothly feed the printing material and can maintain the print image quality high.

CITATION LIST

Patent Literature

PTL 1: Japanese Unexamined Patent Application Publication No. 2014-156317

SUMMARY OF INVENTION

Technical Problem

However, under the situation in which a contacting member having a fiber layer on its surface and a contacted member (e.g., recording medium) are in pressure contact with each other, when the contacted member is conveyed, a boundary is generated on the fiber layer between a region that has been in contact with the contacted member and another region that has not been in contact with the contacted member. If another contacted member to which the liquid composition has been applied is thereafter conveyed over the boundary, an abnormal image may occur. In addition, an adhesive strength between the fiber layer and the substrate to which the fiber layer is fixed is required.

Solution to Problem

In accordance with some embodiments of the present invention, a contacting member that contacts a region of a contacted member to which a liquid composition has been applied is provided. The contacting member comprises a substrate and a fluororesin fiber layer containing a fluororesin fiber. One side of the fluororesin fiber layer is directly or indirectly fixed to the substrate and another side of the fluororesin fiber layer contacts the contacted member. A ratio X/Y is less than 1.00, where X is a presence ratio of the fluororesin fiber in the fluororesin fiber layer on the side which is directly or indirectly fixed to the substrate and Y is a presence ratio of the fluororesin fiber in the fluororesin fiber layer on the other side which contacts the contacted member.

Advantageous Effects of Invention

A contacting member according to an embodiment of the present invention has a fiber layer on its surface and provides an excellent effect of preventing the occurrence of abnormal image and improving an adhesive strength between the fiber layer and a substrate to which the fiber layer is fixed.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1A:
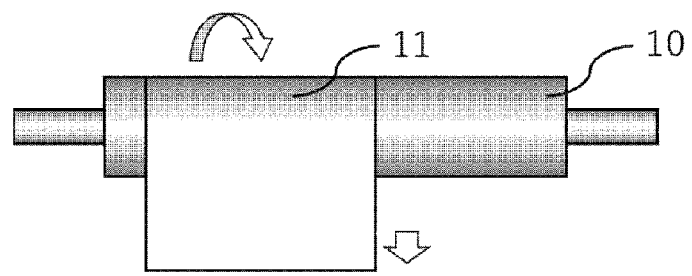
FIG. 1A is a schematic diagram illustrating a situation in which a roller-shaped contacting member conveys a contacted member, where contacted member 11 and contacting member 10 are in pressure contact with each other.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Contacting Member

The contacting member according to an embodiment of the present invention contacts a region of a contacted member to which a liquid composition has been applied. The contacting member includes a substrate and a fluororesin fiber layer that contacts a contacted member and contains a fluororesin fiber. The fluororesin fiber layer is directly or indirectly fixed to the substrate. Here, the case in which the fluororesin fiber layer is directly fixed to the substrate refers to, for example, a case in which the fluororesin fiber layer and the substrate are integrated by heat fusion, an adhesive such as a primer, or a combination thereof. The case in which the fluororesin fiber layer is indirectly fixed to the substrate refers to, for example, a case in which one or more base layers are provided between the fluororesin fiber layer and the substrate, where an integration is achieved between the fluororesin fiber layer and the base layer, between the base layers, or between the base layer and the substrate, by heat fusion, an adhesive such as a primer, or a combination thereof. In the following descriptions, the fluororesin fiber layer being directly or indirectly fixed to the substrate may be simply referred to as the fluororesin fiber layer being fixed to the substrate.

Fluororesin Fiber Layer

The contacting member according to an embodiment of the present invention has a fluororesin fiber layer on a surface which contacts the contacted member, and the fluororesin fiber layer contains a fluororesin fiber. Preferably, the fluororesin fiber layer contains the fluororesin fiber at the outermost surface of the layer. The fluororesin fiber improves lubricity and detachability with respect to the region of the contacted member to which a liquid composition has been applied, which directly contacts the fluororesin fiber. Examples of fluororesin constituting the fluororesin fiber include, but are not limited to, tetrafluoroethylene-perfluoroalkyl vinyl ether copolymer (PFA, melting point: 300 to 310 degrees C.), polytetrafluoroethylene (PTFE, melting point: 330 degrees C.), tetrafluoroethylene-hexafluoropropylene copolymer (FEP, melting point: 250 to 280 degrees C.), ethylene-tetrafluoroethylene copolymer (ETFE, melting point: 260 to 270 degrees C.), polyvinylidene fluoride (PVDF, melting point: 160 to 180 degrees C.), polychlorotrifluoroethylene (PCTFE, melting point: 210 degrees C.), tetrafluoroethylene-hexafluoropropylene-perfluoroalkyl vinyl ether copolymer (EPE, melting point: 290 to 300 degrees C.), and copolymers including the above-described polymers. Among these, polytetrafluoroethylene (PTFE) is preferred.

The fluororesin fiber may be formed by spinning the fluororesin. The fluororesin fiber may be any of a resin fiber made of a single fluororesin, a resin fiber made of a plurality of fluororesins, or a resin fiber in which the fluororesin and a material other than the fluororesin are mixed. Among these, a resin fiber made of a single fluororesin and a resin fiber made of a plurality of fluororesins are preferred. In the present embodiment, the fluororesin fiber refers to a fiberized product of the fluororesin itself or that of a mixture itself of the fluororesin and a material other than the fluororesin. Therefore, for example, those obtained by coating and hardening the surface of a glass resin fiber with a fluororesin are not included in the fluororesin fiber of the present embodiment.

Examples of commercially-available fluororesin fibers include, but are not limited to, TOYOFLON BF800S, 2402, and 1412 (manufactured by Toray Industries, Inc.), all of which are fluororesin fibers containing polytetrafluoroethylene (PTFE).

The thickness of the fluororesin fiber layer is preferably 200 μm or more, and more preferably 300 μm or more. In addition, the thickness of the fluororesin fiber layer is preferably 800 μm or less, and more preferably 700 μm or less. When the surface of the contacting member has a fluororesin fiber structure and the thickness of the layer having the fluororesin fiber structure is 200 μm or more, even when the contacting member comes into contact with the contacted member with a high pressure therebetween, the pressure is dispersed in the direction perpendicular to the plane of contact of the contacting member with the contacted member. Thus, even when the contacting member contacts a region of the contacted member to which a liquid composition has been applied, the liquid composition on the contacted member is prevented from being transferred onto the contacting member. Further, when the thickness of the layer having the fluororesin fiber structure is 800 μm or less, the contacted member is satisfactorily conveyed even when the contacting member is used as a roller for conveying the contacted member. Further, when the thickness of the layer having the fluororesin fiber structure is from 300 to 800 μm, the liquid composition on the contacted member is more prevented from being transferred onto the contacting member. When the thickness of the fluororesin fiber layer is 300 μm or more, the pressure is more dispersed in the direction perpendicular to the plane of contact of the contacting member with the contacted member. When the thickness of the fluororesin fiber layer is 800 μm or less, the fluororesin fiber structure is prevented from sagging due to friction between the fluororesin fiber layer and the contacted member.

The structure of the fluororesin fiber forming the fluororesin fiber layer may be either a monofilament or a multifilament, but a monofilament is preferred. Since the liquid composition hardly permeates the fluororesin fiber of monofilament, even when the contacting member contacts a region of the contacted member to which a liquid composition has been applied, the liquid composition on the contacted member is prevented from being transferred onto the contacting member.

The shape of the fluororesin fiber layer is not particularly limited, but the fluororesin fiber layer is preferably in a sheet-like shape and wound around a substrate. The term "sheet-like" refers to a state in which fibers are processed so as not to be easily separated from each other, so that the fluororesin fiber layer is in a flat or curved shape, and does not refer to a linear state. The process for making fibers not easily separated from each other may be a known process such as a process of mechanically weaving fibers spun by extrusion of raw materials or a process of joining fibers by heat or pressure. In particular, a process of joining fibers having a relatively short length is preferred for the advantage that the number of contact points can be increased while reducing the area of contact. As the fluororesin fiber layer is in a sheet-like shape, a portion of the contacting member which contacts the contacted member becomes the top portion of the fluororesin fiber located at the outermost part of the fluororesin fiber layer. Thus, a large number of the top portions of the fluororesin fibers is made present on the surface of the contacting member while reducing the contact area between the contacting member and the contacted member. Therefore, even when the contacting member contacts a region of the contacted member to which a liquid composition has been applied, the liquid composition on the contacted member is prevented from being transferred onto the contacting member. In the present embodiment, the fluororesin fiber layer which is formed by winding linear fibers around a substrate is not excluded, but the fluororesin fiber layer having the above-described sheet-like shape is preferred. When the fluororesin fiber layer is in a sheet-like shape, the pressure generated between the contacting member and the contacted member is more dispersed as compared with the case in which the fluororesin fiber layer is in a linear shape. Therefore, the liquid composition on the contacted member is prevented from being transferred onto the contacting member.

As described above, the fluororesin fiber layer is "directly or indirectly fixed to the substrate" (hereinafter may be simply referred to as "fixed to the substrate"). At this time, a ratio X/Y is less than 1.00, where X is a presence ratio of the fluororesin fiber in the fluororesin fiber layer on the side which is directly or indirectly fixed to the substrate and Y is a presence ratio of the fluororesin fiber in the fluororesin fiber layer on the other side which contacts the contacted member.

The reason why the ratio X/Y is less than 1.00 is described below with reference to FIG. 1. FIGS. 1A to 1C are schematic diagrams illustrating a situation in which a roller-shaped contacting member conveys a contacted member.

Figure 1B:
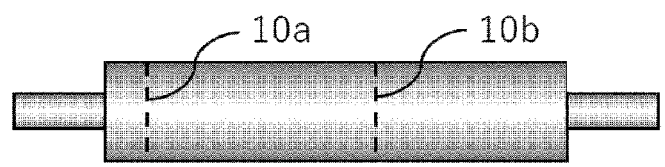
FIG. 1B is a schematic diagram illustrating a situation in which a roller-shaped contacting member conveys a contacted member, where minute steps 10a and 10b are formed on a fiber layer.
Figure 1C:
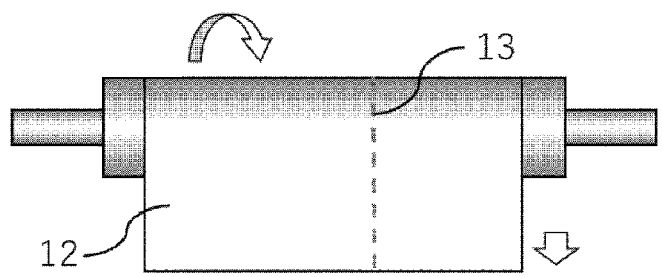
FIG. 1C is a schematic diagram illustrating a situation in which a roller-shaped contacting member conveys a contacted member, where another contacted member 12 is conveyed over the minute step 10b such that an abnormal image 13 may be generated.

As illustrated in FIG. 1A, when a contacted member 11 (e.g., recording medium) is conveyed under the situation in which a contacting member 10 having a fluororesin fiber layer on its surface and the contacted member 11 are in pressure contact with each other, as illustrated in FIG. 1B, minute steps 10a and 10b are formed on the fiber layer at a boundary between a region that has been in contact with the contacted member 11 and another region that has not been in contact with the contacted member 11 due to the difference in the degree of compression of the fluororesin fiber layer. After that, as illustrated in FIG. 1C, when another contacted member 12 to which a liquid composition has been applied is conveyed over the minute step 10b, an abnormal image 13 may be generated in the image formed by the applied liquid composition at a portion which has passed through the minute step 10b. To prevent generation of the abnormal image 13, for example, the side of the fluororesin fiber layer which comes into contact with the contacted members 11 and 12 may be compressed in advance at a pressure equal to or higher than the pressure applied when conveying the contacted members 11 and 12, so that the presence ratio Y of the fluororesin fiber in the fluororesin fiber layer on the side which comes into contact with the contacted members 11 and 12 is increased and formation of the minute step 10b is prevented.

However, when the entire fluororesin fiber layer is compressed to increase the presence ratio of the fluororesin fiber in the entire fluororesin fiber layer, for preventing formation of the minute step 10b due to the difference in the degree of compression of the fluororesin fiber layer, the gap between the fibers constituting the fluororesin fiber layer is reduced and is less likely to be impregnated with an adhesive member that fixes the fluororesin fiber layer to the substrate or base layer of the contacting member, resulting in a decrease of the adhesive strength between the fluororesin fiber layer and the substrate or base layer. In particular, when a fluororesin fiber is used as the fiber as in the present disclosure, the adhesive strength between the fluororesin fiber layer and the substrate or base layer strongly depends on whether the gap between the fluororesin fibers can be sufficiently impregnated with the adhesive member to make the adhesive member physically anchored therein, which may cause a more significant problem as compared with the case of using another type of resin fiber. Such a decrease in adhesive strength can be prevented by, for example, not compressing the fluororesin fiber layer, before being fixed to the substrate or base layer, on the side which is to be fixed to the substrate or base layer so as not to increase the presence ratio X of the fluororesin fiber in the fluororesin fiber layer on the side which is to be fixed to the substrate or base layer, thereby maintaining the gap between the fibers.

Thus, when the ratio X/Y is less than 1.00, it is possible to prevent both the occurrence of an abnormal image and a decrease of the adhesive strength between the fluororesin fiber layer and the substrate or base layer.

The presence ratio X represents the presence ratio of the fluororesin fiber in the fluororesin fiber layer on the side which is fixed to the substrate. For example, the presence ratio X represents the presence ratio of the fluororesin fiber in a portion (hereinafter also referred to as "impregnated portion") where the fluororesin fiber layer is impregnated with the adhesive member that fixes the fluororesin fiber layer to the substrate. A portion where the adhesive member is present but no fluororesin fiber is present is excluded from portions where the presence ratio X is measured.

Further, the presence ratio Y represents the presence ratio of the fluororesin fiber in the fluororesin fiber layer on the side which contacts the contacted member. For example, the presence ratio Y represents the presence ratio of the fluororesin fiber in a portion (hereinafter also referred to as "non-impregnated portion") where the fluororesin fiber layer is not impregnated with the adhesive member that fixes the fluororesin fiber layer to the substrate.

The ratio X/Y is less than 1.00, but is more preferably from 0.3 to 0.8. When the ratio X/Y is within this range, formation of a minute step is prevented when the contacting member comes into contact with the contacted member, and the occurrence of an abnormal image is more prevented. Further, when the ratio X/Y is within this range, the fluororesin fiber and the adhesive member are entangled with each other and a sufficient detachment stress is generated, so that a decrease of the adhesive strength between the fluororesin fiber layer and the substrate or base layer is more prevented.

The presence ratio X and the presence ratio Y are calculated based on the area of fluorine component in a cross section of the fluororesin fiber layer. Specifically, first, the fluororesin fiber layer is cut perpendicularly to the surface direction of the fluororesin fiber layer to form a cross section. Next, this cross section is subjected to mapping of fluorine component. For example, the mapping of fluorine component may be performed by an EDS (Energy Dispersive X-ray Spectroscopy) elemental analyzer (Phenom ProX available from Thermo Fisher Scientific Inc.). Based on the obtained data, the ratio of the area of a portion where fluorine component is present to the area of a portion where no fluorine component is present is calculated by the Pro-Suite software. Of the calculated ratios, the ratio in the fluororesin fiber layer on the side which is fixed to the substrate (for example, the impregnated portion) is defined as the presence ratio X, and the ratio in the fluororesin fiber layer on the side which contacts the contacted member (for example, the non-impregnated portion) is defined as the presence ratio Y. From the calculated presence ratio X and presence ratio Y, the ratio X/Y is determined. In calculating the presence ratio X and the presence ratio Y, the average value of values measured at 5 positions within a measurement area of 100 μm×100 μm is used.

Preferably, the fluororesin fiber layer has an air permeability of from 4 to 16 seconds, for preventing image detachment. When the air permeability is 4 seconds or more, the pressure from the contacted member at the plane of contact is effectively dispersed, thus improving the effect of preventing image detachment. When the air permeability is 16 seconds or less, the contacting member is prevented from closely adhering to the contacted member, thus improving the effect of preventing image detachment. In the present embodiment, the air permeability is measured by a Gurley automatic air permeability meter (manufactured by YASUDA SEIKI SEISAKUSHO, LTD.) according to a method based on ISO 5636. More specifically, the time required for 300 ml of air to pass through the fluororesin fiber layer with respect to a passage diameter of 10 mm is measured. The measurement is performed at 10 different positions, and the average value is defined as the air permeability.

A detachment force that is a force required to detach the fluororesin fiber layer from the substrate is preferably 7 N/cm or more. When the detachment force is 7 N/cm or more, it is possible to prevent a decrease of the adhesive strength between the fluororesin fiber layer and the substrate or base layer. In the present disclosure, the detachment force is obtained by making a cut on the fluororesin fiber layer disposed on the contacting member and measuring a 90° detachment stress at a speed of 100 mm/5 seconds at the cut portion of the fluororesin fiber layer. Specifically, first, a razor is vertically applied to the fluororesin fiber layer disposed on the contacting member to make a cut so as to surround a region (evaluation region) having a width of 30 mm and a length of 100 mm. Next, the end portion of the evaluation area on the short-width side is grasped, and the detachment force is measured using a digital force gauge (available from A&D Company, Limited) under the above-described conditions. The maximum value within a measurement distance of 100 mm is employed as the measurement value. In this measurement, 3 evaluation regions with different positions are created, and the average value of values measured in respective regions is employed.

Substrate

Preferably, the substrate is a long rod-shaped body made of a metal. More preferably, the substrate is a roller-shaped body such as a columnar or cylindrical body having a circular cross section. When the substrate has such a shape, the contacting member can be used as a roller for conveying the contacted member. When the contacting member is used as the roller, the diameter of the circular cross section of the substrate is preferably from 50 to 100 mm. When the diameter is within this range, even when the contacting member contacts a region of the contacted member to which a liquid composition has been applied, the liquid composition on the contacted member is prevented from being transferred onto the contacting member. When the diameter is 50 mm or more, the pressure per unit area generated between the contacting member and the contacted member is reduced, and the liquid composition is prevented from being transferred. When the diameter is 100 mm or less, the occurrence of slippage is prevented between the contacting member and the contacted member, thereby preventing the liquid composition from being transferred.

Examples of the material of the substrate include, but are not limited to, various metals such as stainless steel and aluminum, sintered bodies of metals such as copper and stainless steel, and sintered bodies of ceramics.

Preferably, the substrate is made of porous body. In a case in which the contacting member is configured with the substrate made of porous body and the fluororesin fiber layer disposed thereon, even when the contacting member contacts a region of the contacted member to which a liquid composition has been applied, the liquid composition on the contacted member is prevented from being transferred onto the contacting member. This is because the fluororesin fiber layer enters pores present on the surface of the porous body when a pressure is generated upon contact of the contacting member with the contacted member, thereby dispersing the pressure. Further, in volatilizing liquid components from the liquid composition on the contacted member, volatile components can be released through the fluororesin fiber layer and the substrate when the substrate is made of porous body. Thus, the volatilized liquid components are prevented from becoming droplets on the surface of the contacting member. Examples of the material of the substrate made of porous body include, but are not limited to, sintered bodies of metals such as copper and stainless steel and sintered bodies of ceramics. When the contacting member having the substrate made of porous body is heated to be used as means for drying the region on the contacted member to which the liquid composition has been applied, the substrate is preferably made of sintered body of a metal having a high thermal conductivity such as copper and stainless steel.

Method for Manufacturing Contacting Member

A method for manufacturing the contacting member according to an embodiment of the present invention includes: an adhesive layer forming step in which an adhesive is applied to a substrate to form an adhesive layer; an adhesive permeation step in which a fluororesin fiber layer is disposed on the adhesive layer and the adhesive is made permeate the fluororesin fiber layer to impregnate the fluororesin fiber layer with the adhesive; a fixation step in which the adhesive permeating the fluororesin fiber layer is cured to form an adhesive member to fix the substrate and the fluororesin fiber layer to each other; and a pressing step in which the fluororesin fiber layer fixed to the substrate is pressed to enhance the presence ratio of the fluororesin fiber in a region of the fluororesin fiber layer not impregnated with the adhesive member.

Figure 2A:
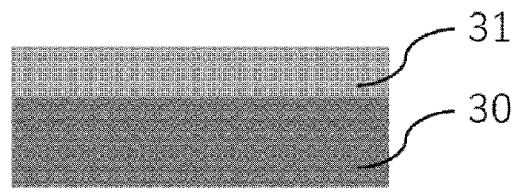
FIG. 2A is a schematic diagram illustrating a method for manufacturing a contacting member, where an adhesive is applied onto a substrate 30 to form an adhesive layer 31.
Figure 2B:
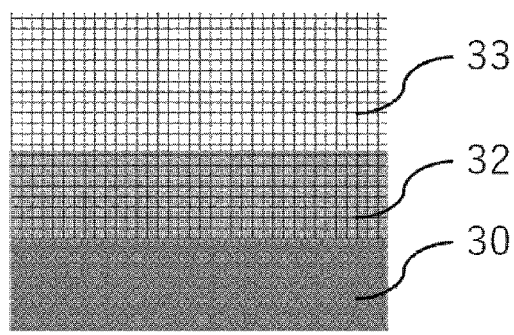
FIG. 2B is a schematic diagram illustrating a method for manufacturing a contacting member, where an adhesive impregnated region 32 and an adhesive non-impregnated region 33 are formed on the substrate 30.
Figure 2C:
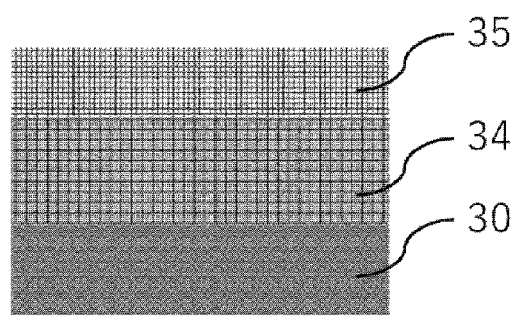
FIG. 2C is a schematic diagram illustrating a method for manufacturing a contacting member, where a non-impregnated portion 35 with a higher presence ratio of fluororesin fiber is formed.

This manufacturing method is described below with reference to FIGS. 2A to 2C. FIGS. 2A to 2C are schematic diagrams illustrating a method for manufacturing the contacting member. First, as illustrated in FIG. 2A, an adhesive is applied onto a substrate 30 to form an adhesive layer 31. Next, a fluororesin fiber layer is disposed on the adhesive layer 31 and the adhesive is made permeate a part of the fluororesin fiber layer to impregnate the part of the fluororesin fiber layer with the adhesive. As a result, as illustrated in FIG. 2B, an adhesive impregnated region 32 that is a part of the fluororesin fiber layer impregnated with the adhesive and an adhesive non-impregnated region 33 that is another part of the fluororesin fiber layer not impregnated with the adhesive are formed on the substrate 30. The adhesive permeating the adhesive impregnated region 32 is then cured to form an adhesive member, whereby the substrate and the fluororesin fiber layer are fixed to each other. Further, as the fluororesin fiber layer fixed to the substrate is pressed, the adhesive non-impregnated region 33 is compressed and a non-impregnated portion 35 with a higher presence ratio of the fluororesin fiber is formed, as illustrated in FIG. 2C. On the other hand, the adhesive impregnated region 32 is hardly compressed because the gap between the fluororesin fibers is impregnated with the adhesive member, and therefore an impregnated portion 34 with a lower presence ratio of the fluororesin fiber than the non-impregnated portion 35 is formed.

In the present embodiment, it is preferable that the method do not include a step of pressing the fluororesin fiber layer before the fixation step. When the method does not include the step of pressing the fluororesin fiber layer before the fixation step, the detachment force that is a force required for detaching the fluororesin fiber layer from the substrate is increased. As the detachment force is increased, it is possible to prevent a decrease of the adhesive strength between the fluororesin fiber layer and the substrate or base layer.

Drying Device and Printing Apparatus

A drying device according to an embodiment of the present invention is configured to dry a contacted member to which a liquid composition has been applied. The drying device includes the above-described contacting member, and optionally a liquid composition heater configured to heat the liquid composition applied to the contacted member, a contacting member heater configured to heat the contacting member, and the like, as necessary.

A printing apparatus according to an embodiment of the present invention includes a liquid composition applicator configured to apply a liquid composition to a contacted member, a conveyance path through which the contacted member to which the liquid composition has been applied passes, and the above-described contacting member, and optionally a contacted member feeder configured to feed a contacted member, a liquid composition heater configured to heat the liquid composition applied to the contacted member, a contacting member heater configured to heat the contacting member, and the like, as necessary.

Figure 3:
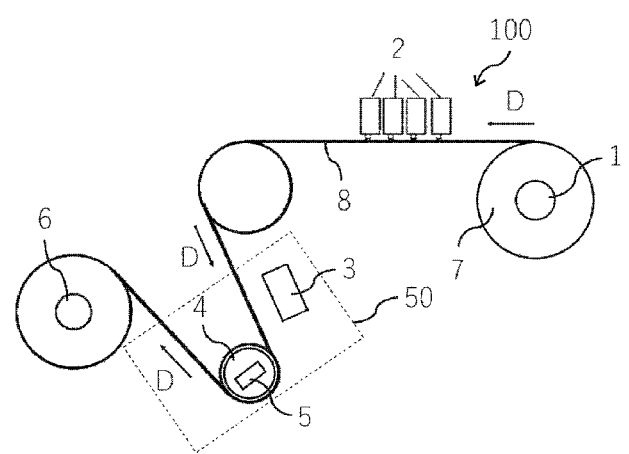
FIG. 3 is a schematic diagram illustrating a printing apparatus that uses a continuous sheet.

The drying device and the printing apparatus are described in detail below with reference to FIG. 3. FIG. 3 is a schematic diagram illustrating a printing apparatus that uses a continuous sheet. A printing apparatus 100 illustrated in FIG. 3 includes a contacted member feeder 1, a liquid composition applicator 2, a liquid composition heater 3, a contacting member 4, a contacting member heater 5, and a contacted member collector 6. The printing apparatus 100 includes a drying device 50. The drying device 50 may be an apparatus either integrated with or separated from the printing apparatus.

Contacted Member Feeder

The contacted member feeder 1 is rotationally driven to feed a contacted member 7 stored wound in a roll to a conveyance path 8 in the printing apparatus 100. The conveyance direction of the contacted member 7 in the conveyance path 8 is indicated by an arrow D in FIG. 3.

The rotary drive of the contacted member feeder 1 is adjusted such that the contacted member 7 is conveyed at a high speed of 50 m/min or higher.

The contacted member 7 is a sheet-like object to be conveyed that is continuous in the conveyance direction D in the printing apparatus 100. Specific examples thereof include a recording medium such as a continuous sheet. Examples of the continuous sheet include, but are not limited to, a rolled sheet and a folded sheet folded at predetermined intervals. The contacted member 7 is conveyed along the conveyance path 8 between the contacted member feeder 1 and the contacted member collector 6. The length of the contacted member 7 in the conveyance direction D is longer than at least the length of the conveyance path 8 provided for conveying the contacted member 7 between the contacted member feeder 1 and the contacted member collector 6. The printing apparatus 100 of the present embodiment uses the contacted member 7 that is continuous in the conveyance direction D in the printing apparatus 100. To convey the contacted member 7 at a high speed, a large tension is applied to the contacted member 7 between the contacted member feeder 1 and the contacted member collector 6.

Liquid Composition Applicator

The liquid composition applicator 2 is an inkjet discharge head having a plurality of nozzle arrays in each of which a plurality of nozzles is arranged. The liquid composition applicator 2 is disposed such that the direction of discharge of ink from the nozzles is directed to the conveyance path 8 for conveying the contacted member 7. Thus, the liquid composition applicator 2 sequentially applies to the contacted member 7 magenta (M), cyan (C), yellow (Y), and black (K) inks and an aftertreatment liquid for protecting the surface of the applied ink, each serving as a liquid composition. The colors of the discharged inks are not limited to these, and may be white, gray, silver, gold, green, blue, orange, violet, or the like.

In the present embodiment, the case in which the liquid composition is an ink and an aftertreatment liquid is illustrated, but the liquid composition is not limited thereto. Examples thereof include, but are not limited to, an ink, a pretreatment liquid for coagulating a colorant contained in the ink, an aftertreatment liquid for protecting the surface of the applied ink, and an electric circuit forming liquid dispersing inorganic particles (e.g., metal particles). These may be appropriately mixed or applied superimposed each other. In the present embodiment, the case in which the liquid composition is applied to the contacted member 7 by the inkjet discharge head is illustrated, but the liquid composition may be applied by other devices or methods. For example, various known methods such as spin coating, spray coating, gravure roll coating, reverse roll coating, and bar coating may be used.

Liquid Composition Heater

The liquid composition heater 3 heats the liquid composition applied to the contacted member 7 from the back side of the surface of the contacted member 7 having the region to which the liquid composition has been applied. The liquid composition heater 3 is not particularly limited. Examples thereof include various known devices such as a hot air blower, and a dryer that brings the back surface of the contacted member 7 into contact with a heating roller, a flat heater, or the like.

Contacting Member

The contacting member 4 changes the conveyance direction D of the contacted member 7 while conveying the contacted member 7. The contacting member 4 is a columnar or cylindrical roller.

In the printing apparatus 100 of the present embodiment, as described above, the contacted member feeder 1 conveys the contacted member 7 at a speed of 50 m/min or higher. In such a high-speed conveyance, as illustrated in FIG. 3, when the conveyance direction of the contacted member 7 is changed by the contacting member 4, a large pressure is applied between the contacting member 4 and the contacted member 7. Therefore, it is likely that a minute step is formed on the fluororesin fiber layer of the contacting member 4 at a boundary between a region contacting the contacted member 7 and another region not contacting the contacted member 7. Accordingly, when the contacted member 7 is thereafter conveyed over the minute step, an abnormal image is likely to be generated. Thus, the contacting member according to the present embodiment is preferably used. In addition, when the contacting member 4 comes into contact with the region on the contacted member 7 to which the liquid composition has been applied, the liquid composition is likely to be transferred onto the contacting member 4. Therefore, the contacting member according to the present embodiment is preferably used.

As described above, the printing apparatus 100 of the present embodiment uses the contacted member 7 that is continuous in the conveyance direction D in the printing apparatus 100. To convey the contacted member 7 at a high speed, a large tension is applied to the contacted member 7 between the contacted member feeder 1 and the contacted member collector 6. In such a case, as illustrated in FIG. 3, when the conveyance direction of the contacted member 7 that is applied with a large tension is changed by the contacting member 4, a large pressure is applied between the contacting member 4 and the contacted member 7. Therefore, it is likely that a minute step is formed on the fluororesin fiber layer of the contacting member 4 at a boundary between a region contacting the contacted member 7 and another region not contacting the contacted member 7. Accordingly, when the contacted member 7 is thereafter conveyed over the minute step, an abnormal image is likely to be generated. Thus, the contacting member according to the present embodiment is preferably used. In addition, when the contacting member 4 comes into contact with the region on the contacted member 7 to which the liquid composition has been applied, the liquid composition is likely to be transferred onto the contacting member 4. Therefore, the contacting member according to the present embodiment is preferably used.

As illustrated in FIG. 3, the contacting member 4 is disposed downstream from the liquid composition heater 3 in the conveyance direction D of the contacted member 7. The contacting member 4 comes into contact with the region of the contacted member 7 to which the liquid composition has been applied after the liquid composition on the contacted member 7 has been dried by the liquid composition heater 3. Therefore, the liquid composition is more prevented from being transferred onto the contacting member 4, which is preferable.

Further, it is preferable that the member that first comes into contact with the region of the contacted member 7 to which the liquid composition has been applied after the liquid composition on the contacted member 7 has been dried by the liquid composition heater 3 be the contacting member 4. Because the liquid composition is likely to be transferred onto the member that first comes into contact with the region of the contacted member 7 to which the liquid composition has been applied, the contacting member according to the present embodiment is preferably used as that member.

Figure 4:
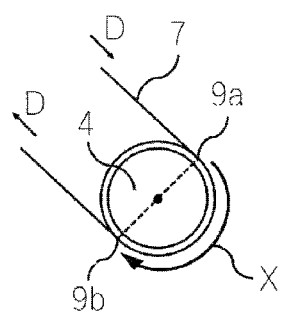
FIG. 4 is a schematic diagram illustrating a situation in which a contacted member is in contact with a contacting member.

When the contacting member 4 is a roller, as illustrated in FIG. 3, as the contacted member 7 comes to wind around the roller, the roller comes into contact with the region of the contacting member 7 to which the liquid composition has been applied. At this time, a winding ratio of the contacted member 7 with respect to the roller is preferably 10% or more, more preferably 15% or more, and much more preferably 20% or more. When the winding ratio is 10% or more, the pressure per unit area generated between the roller and the contacted member 7 is reduced, and the liquid composition is prevented from being transferred onto the roller. In addition, the winding ratio of the contacted member 7 with respect to the roller is preferably 90% or less, more preferably 70% or less, and much more preferably 50% or less. When the winding ratio is 50% or less, the contacted member 7 can be suitably conveyed. The "winding ratio" in the present embodiment is described in detail below with reference to FIG. 4. FIG. 4 is a schematic diagram illustrating a situation in which the contacted member is in contact with the contacting member. When the contacted member 7 is in contact with the contacting member 4 in a roller shape as being wound around the contacting member 4, as illustrated in FIG. 4, the "winding ratio" is defined as the ratio of a circumferential length X of the contacting member 4 between end portions 9a and 9b to the total circumferential length of the contacting member 4. Here, the circumferential length X is defined on a side where the contacted member 7 and the contacting member 4 is contacting, and the end portions 9a and 9b are portions at each of which the contacted member 7 separates from the contacting member 4.

Contacting Member Heater

The contacting member heater 5 heats the contacting member 4. The heated contacting member 4 comes into contact with the region of the contacted member 7 to which the liquid composition has been applied, thereby drying the region of the contacted member 7 to which the liquid composition has been applied. At this time, not only when the liquid composition is insufficiently dried but also when the resin contained in the liquid composition is softened by heat, it is likely that the liquid composition is undesirably transferred onto the contacting member 4. Thus, the contacting member according to the present embodiment is preferably used.

Examples of the contacting member heater 5 include various known devices such as a heater and a hot air blower.

The contacting member heater 5 may be disposed either inside the contacting member 4 as illustrated in FIG. 3 or outside the contacting member 4. Further, the contacting member heater 5 may be provided either separately from the contacting member 4 or integrated with the contacting member 4. In a case in which the substrate of the contacting member 4 is a porous body and the contacting member heater 5 is disposed inside the contacting member 4, heat or hot air generated from the contacting member heater 5 can be efficiently transmitted to the contacted member 7.

Contacted Member Collector

The contacted member collector 6 rotary-drives to wind up in a roll the contacted member 7 on which an image has been formed with the liquid composition having been applied.

Printing Method

A printing method according to an embodiment of the present invention includes a liquid composition applying step for applying a liquid composition to a contacted member, and a contacting step in which a contacting member comes into contact with a region of the contacted member to which the liquid composition has been applied. The printing method further includes a liquid composition heating step, if necessary.

Liquid Composition Applying Step

The liquid composition applying step is a step for applying a liquid composition (e.g., ink) to the contacted member 7 fed by the contacted member feeder 1. As a result, a region to which the liquid composition has been applied is formed on the contacted member 7.

Liquid Composition Heating Step

The liquid composition heating step is a step for drying the applied liquid composition by application of heat after the liquid composition applying step. Preferably, the drying is performed to such an extent that the recording medium becomes not sticky. The applied liquid composition may be either dried by the liquid composition heater 3 as illustrated in FIG. 3 or dried naturally without using any drying device.

Contacting Step

The contacting step is a step in which the contacting member 4 comes into contact with the region of the contacted member 7 to which the liquid composition has been applied. The region to which the liquid composition has been applied refers to a region on the surface of the contacted member 7 to which the liquid composition has been applied and excludes a region on the opposite surface to which the liquid composition has not been applied. Further, the region to which the liquid composition has been applied indicates a location specified by the application of the liquid composition, regardless of the state of the liquid composition. In other words, at the time when the contacting member comes into contact with the region to which the liquid composition has been applied, the liquid composition needs not to be maintained in a liquid state that is the state at when the liquid composition was applied to this region. The liquid composition may be in a liquid state in which a part of the liquid components in the liquid composition has been vaporized or may be in a solid state in which all the liquid components in the liquid composition have been vaporized.

As illustrated in FIG. 3, the contacted member 7 is conveyed while being in contact with the contacting member 4. Further, the contacting member 4 changes the conveyance direction D of the contacted member 7 by conveying the contacted member 7 so as to be wound therearound. Furthermore, when the contacting member heater 5 is disposed inside or near the contacting member 4, the contacting member 4 dries the region on the contacted member 7 to which the liquid composition has been applied while conveying the contacted member 7.

Liquid Composition

The liquid composition according to an embodiment of the present invention is not particularly limited. Examples thereof include, but are not limited to, an ink, a pretreatment liquid for coagulating a colorant contained in the ink, an aftertreatment liquid for protecting the surface of the applied ink, and an electric circuit forming liquid dispersing inorganic particles (e.g., metal particles). These can be appropriately used in a known composition. Hereinafter, a case in which an ink and an aftertreatment liquid are each used as the liquid composition is described as an example.

Ink

Compositional materials of the ink, such as organic solvents, water, colorants, resins, waxes, and additives, are described in detail below.

Organic Solvent

The organic solvent is not particularly limited and water-soluble organic solvents can be used. Examples thereof include, but are not limited to, polyols, ethers such as polyol alkyl ethers and polyol aryl ethers, nitrogen-containing heterocyclic compounds, amides, amines, and sulfur-containing compounds.

Specific examples of the polyols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol.

Specific examples of the polyol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Specific examples of the polyol aryl ethers include, but are not limited to, ethylene glycol monophenyl ether and ethylene glycol monobenzyl ether.

Specific examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Specific examples of the amides include, but are not limited to, formamide, N-methylformamide, N,N-dimethylformamide, 3-methoxy-N,N-dimethylpropionamide, and 3-butoxy-N,N-dimethylpropionamide.

Specific examples of the amines include, but are not limited to, monoethanolamine, diethanolamine, and triethylamine.

Specific examples of the sulfur-containing compounds include, but are not limited to, dimethylsulfoxide, sulfolane, and thiodiethanol.

Specific examples of other organic solvents include, but are not limited to, propylene carbonate and ethylene carbonate.

In particular, organic solvents having a boiling point of 250 degrees C. or less are preferred, since they not only function as wetting agents but also provide good drying property.

Preferred examples of the organic solvent further include polyol compounds having 8 or more carbon atoms and glycol ether compounds. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In particular, when a resin is used as an ink composition, N,N-dimethyl-β-butoxypropionamide, N,N-dimethyl-β-ethoxypropionamide, 3-ethyl-3-hydroxymethyloxetane, and propylene glycol monomethyl ether are preferred. Each of these can be used alone or in combination with others. Among these, amide solvents such as 3-butoxy-N,N-dimethylpropionamide and 3-methoxy-N,N-dimethylpropionamide are particularly preferred. In this case, formation of the resin film is promoted and high abrasion resistance is expressed.

Preferably, the organic solvent has a boiling point of from 180 to 250 degrees C. When the boiling point is 180 degrees C. or higher, the evaporation rate during drying can be appropriately adjusted, leveling is sufficiently performed, surface irregularities are reduced, and glossiness can be improved. By contrast, when the boiling point is higher than 250 degrees C., drying property is low, which may require drying for a long period of time. With the recent speeding up of printing technology, the time required for drying the ink has become rate-determining and the drying time should be shortened. Drying for a long period of time is not preferred.

The proportion of the organic solvent in the ink is not particularly limited and can be suitably selected to suit to a particular application, but is preferably from 10% to 60% by mass, more preferably from 20% to 60% by mass, for drying property and discharge reliability of the ink.

The proportion of the amide solvent in the ink is preferably from 0.05% to 10% by mass, more preferably from 0.1% to 5% by mass.

Water

The proportion of water in the ink is not particularly limited and can be suitably selected to suit to a particular application, but is preferably from 10% to 90% by mass, more preferably from 20% to 60% by mass, for drying property and discharge reliability of the ink.

Colorant

The colorant is not particularly limited, and pigments and dyes can be used as the colorant. Usable pigments include both inorganic pigments and organic pigments. Each of these may be used alone or two or more of these may be used in combination. Mixed crystals can also be used as the pigments.

Usable pigments include black pigments, yellow pigments, magenta pigments, cyan pigments, white pigments, green pigments, orange pigments, glossy color pigments (e.g., gold pigments and silver pigments), and metallic pigments.

Specific examples of inorganic pigments include, but are not limited to, titanium oxide, iron oxide, calcium carbonate, barium sulfate, aluminum hydroxide, Barium Yellow, Cadmium Red, Chrome Yellow, and carbon black produced by a known method such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for solvents are preferred. In addition, hollow resin particles and hollow inorganic particles can also be used.

Specific examples of pigments used for black-and-white printing include, but are not limited to, carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (Yellow Iron Oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1,2,15 (Phthalocyanine Blue), 15:1, 15:2, 15:3, 15:4 (Phthalocyanine Blue), 16, 17:1, 56, 60, and 63; and C.I. Pigment Green 1,4,7,8,10,17, 18, and 36.

The dyes are not particularly limited, and acid dyes, direct dyes, reactive dyes, and basic dyes can be used. Each of these can be used alone or in combination with others. Specific examples of the dyes include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the colorant in the ink is preferably from 0.1% to 15% by mass, more preferably from 1% to 10% by mass, for improving image density, fixability, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. This pigment may be referred to as a resin-covered pigment. In this case, not all the pigment particles included in the ink should be covered with a resin. It is possible that a part of the pigment particles is not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

For example, a nonionic surfactant RT-100 (available from Takemoto Oil & Fat Co., Ltd.) and sodium naphthalenesulfonate formalin condensate are preferably used as the dispersant.

Each of the above dispersants may be used alone or in combination with others.

Pigment Dispersion

The ink can be obtained by mixing a pigment with other materials such as water and an organic solvent. The ink can also be obtained by, first, preparing a pigment dispersion by mixing a pigment with water, a dispersant, etc., and thereafter mixing the pigment dispersion with other materials such as water and an organic solvent.

The pigment dispersion can be obtained by mixing water, a pigment, a pigment dispersant, and other components, if any, to disperse the pigment, and adjusting the particle diameter of the pigment. Preferably, the dispersing is performed by a disperser.

The particle diameter of the pigment dispersed in the pigment dispersion is not particularly limited, but the number-based maximum frequency particle diameter is preferably in the range of from 20 to 500 nm, more preferably from 20 to 150 nm, for improving dispersion stability of the pigment and discharge stability and image quality (e.g., image density) of the ink. The particle diameter of the pigment can be measured with a particle size analyzer (NANOTRAC WAVE-UT151 available from MicrotracBEL Corp.).

The proportion of the pigment in the pigment dispersion is not particularly limited and can be suitably selected to suit to a particular application, but is preferably from 0.1% to 50% by mass, more preferably from 0.1% to 30% by mass, for improving discharge stability and enhancing image density.

Preferably, the pigment dispersion is subjected to filtration using a filter or a centrifugal separator to remove coarse particles, followed by degassing.

Resin

The type of the resin contained in the ink is not particularly limited and can be suitably selected to suit to a particular application. Specific examples thereof include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

Resin particles made of these resins may also be used. The resin particles may be dispersed in water serving as a dispersion medium to prepare a resin emulsion. The ink can be obtained by mixing the resin emulsion with other materials such as a colorant and an organic solvent. These resin particles are available either synthetically or commercially. The resin particles may include one type or two or more types of resin particles.

Among these, urethane resin particles are preferably used in combination with other resin particles because an image formed with an ink containing urethane resin particles has so large a tackiness that blocking resistance is deteriorated. On the other hand, the large tackiness of urethane resin particles makes it possible to firmly form an image with an improve fixability. In addition, an image formed with an ink containing urethane resin particles having a glass transition temperature (Tg) of from −20 to 70 degrees C. have a greater tackiness and fixability is more improved.

Among the above resins, acrylic resin particles containing an acrylic resin are widely used because of their excellent discharge stability and low cost. However, because of poor rub resistance, acrylic resin particles are preferably used in combination with urethane resin particles having elasticity. The mass ratio (urethane resin particles/acrylic resin particles) of urethane resin particles to acrylic resin particles in the ink is preferably from 0.03 to 0.7, more preferably from 0.1 to 0.7, and most preferably from 0.23 to 0.46.

The volume average particle diameter of the resin particles is not particularly limited and can be suitably selected to suit to a particular application, but is preferably from 10 to 1,000 nm, more preferably from 10 to 200 nm, and particularly preferably from 10 to 100 nm, for good fixability and high image hardness.

The volume average particle diameter can be measured with a particle size analyzer (NANOTRAC WAVE-UT151 available from MicrotracBEL Corp.).

The proportion of the resin in the ink is not particularly limited and can be suitably selected to suit to a particular application, but is preferably from 1% to 30% by mass, more preferably from 5% to 20% by mass, for fixability and storage stability of the ink.

The particle size of solid contents in the ink is not particularly limited and can be suitably selected to suit to a particular application. The number-based maximum frequency particle diameter of solid contents in the ink is preferably in the range of from 20 to 1,000 nm, more preferably from 20 to 150 nm, for improving discharge stability and image quality (e.g., image density). The solid contents include the resin particles and pigment particles. The particle diameter can be measured with a particle size analyzer (NANOTRAC WAVE-UT151 available from MicrotracBEL Corp.).

Wax

When the ink contains a wax, rub resistance is improved. When the ink contains a wax in combination with the resin, glossiness is improved. Preferred examples of the wax include a polyethylene wax. Examples of commercially-available products of the polyethylene wax include, but are not limited to, AQUACER 531 (manufactured by BYK Japan KK), POLYRON P-502 (manufactured by Chukyo Yushi Co., Ltd.), AQUAPETRO DP2502C (manufactured by TOYO ADL CORPORATION), and AQUAPETRO DP2401 (manufactured by TOYO ADL CORPORATION). Each of these can be used alone or in combination with others.

The proportion of the polyethylene wax the ink is preferably from 0.05% to 2% by mass, more preferably from 0.05% to 0.5% by mass, much more preferably from 0.05% to 0.45% by mass, and most preferably from 0.15% to 0.45% by mass. When the proportion is from 0.05% to 2% by mass, rub resistance and glossiness are sufficiently improved. When the proportion is 0.45% by mass or less, storage stability and discharge stability of the ink are particularly good, and the ink is more suitable for use in an inkjet system.

Additives

The ink may further contain a surfactant, a defoamer, a preservative, a fungicide, a corrosion inhibitor, and/or a pH adjuster.

Aftertreatment Liquid

The aftertreatment liquid is not particularly limited as long as it is capable of forming a transparent layer. The aftertreatment liquid may be prepared by mixing the same organic solvent used for the ink, water, a resin, a surfactant, a defoamer, a pH adjuster, a preservative, a fungicide, and/or a corrosion inhibitor, selected according to the need. The aftertreatment liquid can be applied to the entire region of the contacted member or only to the region to which an ink has been applied.

Physical Properties of Region to which Liquid Composition has been Applied

Preferably, the region to which the liquid composition has been applied has a tack force of from 80 to 110 nN. When the tack force is 80 nN or more, a region formed by application of the liquid composition (e.g., an image portion, when an ink is used as the liquid composition) is improved in binding force, thereby increasing film strength and exhibiting sufficient fixability. When the tack force is 110 nN or less, even when the contacting member contacts the region on the contacted member to which the liquid composition has been applied, the liquid composition is less likely to be transferred onto the contacting member.

Figure 5:
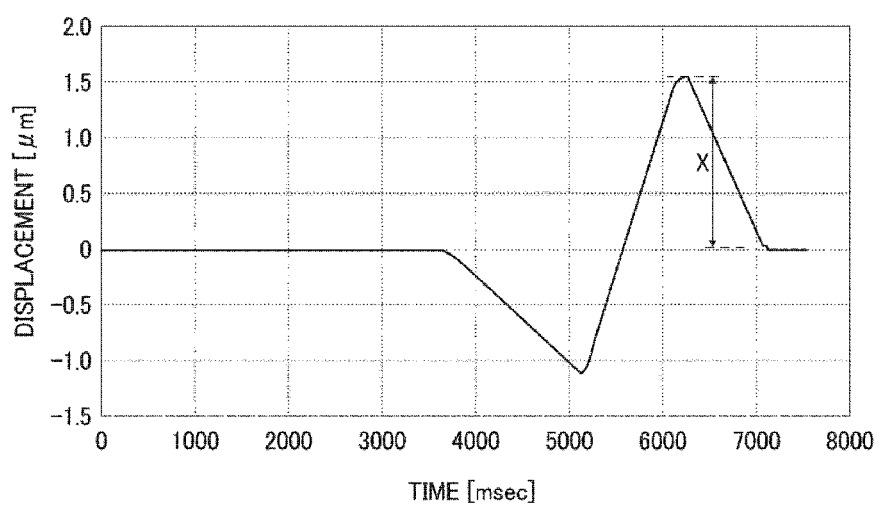
FIG. 5 is a graph showing a force curve obtained using an atomic force microscope.
Figure 6:
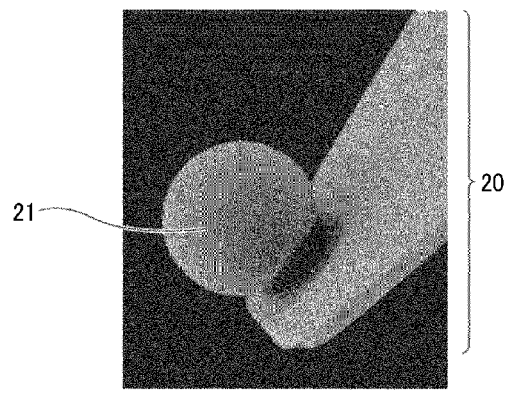
FIG. 6 is a photograph of a cantilever provided with a probe.

The tack force in the region to which the liquid composition has been applied can be calculated, for example, by the following method. The tack force in the region of the contacted member to which the liquid composition has been applied may be measured with an atomic force microscope (hereinafter may be referred to as "AFM") SPM-9500J3 available from Shimadzu Corporation. The target for measuring the tack force is the region on the contacted member to which the liquid composition has been applied with various printing apparatuses. The probe of the AFM is brought into contact with the image, pushed therein for 100 nm, and pulled up. The bending of the cantilever when the cantilever separates from the image is monitored to obtain a force curve as shown in FIG. 5. A value obtained by multiplying a displacement x by a spring constant k of a cantilever 20 as illustrated in FIG. 6 is defined as the tack force (F=kx). The cantilever 20 may be equipped with a spherical silicon oxide as a probe 21. The measurement is performed under the following conditions: the measurement temperature is 23 degrees C., the relative humidity is 35% RH, the probe diameter is 3.5 μm, the measurement mode is force curve measurement, and the measurement frequency is 1 Hz.

A method for easily adjusting the tack force in the region to which the liquid composition has been applied to from 80 to 110 nN is not particularly limited. Examples thereof include, but are not limited to, a method of using a liquid composition containing a colorant, water, an organic solvent, and a wax, and a method of adjusting the mass ratio (urethane resin particles/acrylic resin particles) of urethane resin particles to acrylic resin particles to from 0.1 to 0.7.

Contacted Member

The contacted member is not particularly limited. Examples thereof include, but are not limited to, recording media such as plain paper, gloss paper, special paper, and cloth. In particular, low-permeability recording medium (also referred to as "low-absorptivity recording media") are suitable.

The low-permeability recording media refer to recording media having a surface with a low level of moisture permeability, absorptivity, and/or adsorptivity, and include a material having a number of hollow spaces inside but not opened to the exterior. Examples of the low-permeability recording media include, but are not limited to, coated papers used in commercial printing, and recording media such as paperboard in which waste paper pulp is blended into the intermediate layer and the back layer and a coating is provided on the surface. In a case in which such a low-permeability recording medium is used, when the contacting member comes into contact with the region on the contacted member to which the liquid composition has been applied, the liquid composition is likely to be transferred onto the contacting member. Therefore, the contacting member according to the present embodiment is preferably used.

Low-Permeability Recording Media

Examples of the low-permeability recording media include, but are not limited to, a recording medium such as a coated paper having a support substrate, a surface layer provided on at least one surface of the support substrate, and optionally other layers as necessary.

In a recording medium having a support substrate and a surface layer, the transfer amount of pure water to the recording medium within a contact time of 100 ms, measured by a dynamic scanning absorptometer, is preferably from 2 to 35 mL/m$^2$, more preferably from 2 to 10 mL/m$^2$.

When the transfer amount of pure water within a contact time of 100 ms is too small, beading (i.e., a phenomenon in which adjacent dots attract each other to make the image surface rough) is likely to occur. When the transfer amount is too large, the ink dot diameter in the image may become too smaller than a desired diameter.

In addition, the transfer amount of pure water to the recording medium within a contact time of 400 ms, measured by a dynamic scanning absorptometer, is preferably from 3 to 40 mL/m$^2$, more preferably from 3 to 10 mL/m$^2$.

When the transfer amount of pure water within a contact time of 400 ms is too small, drying property is insufficient. When the transfer amount is too large, it is likely that the dried image has low glossiness. The transfer amount of pure water within a contact time of 100 ms or 400 ms is measured at the surface of the recording medium which has a surface layer thereon.

The dynamic scanning absorptometer ("DSA") is an instrument capable of accurately measuring the amount of liquid absorption within an extremely short time period, as disclosed in a paper entitled "Development and application of dynamic scanning absorptometer—Automation and improvement of Bristow measurement—", Shigenori Kuga, et al., Japan Tappi Journal, Volume 48, 1994, No. 5, pp. 88-92. The dynamic scanning absorptometer provides an automated measurement that involves directly measuring the rate of liquid absorption by tracking the motion of meniscus in a capillary, spirally scanning a liquid supply head on a disc-shaped specimen, and automatically varying the scanning speed according to the preset pattern to perform the measurement required number of times using a single specimen.

The liquid supply head for supplying a liquid to a paper specimen is connected to the capillary via a TEFLON (registered trademark) tube. The position of meniscus is automatically tracked by an optical sensor. In particular, the transfer amount of pure water or ink may be measured by a dynamic scanning absorptometer K350 series D type (available from Kyowa Co., Ltd.).

The transfer amount within a contact time period of 100 ms or 400 ms is determined by interpolating the transfer amounts measured within contact time periods near 100 ms or 400 ms.

Support Substrate

The support substrate is not particularly limited and can be suitably selected to suit to a particular application. Examples thereof include, but are not limited to, sheet-like materials such as wood-fiber-based paper and wood-fiber-and-synthetic-fiber-based non-woven fabric.

The thickness of the support substrate is not particularly limited and can be suitably selected to suit to a particular application, but is preferably from 50 to 300 μm.

The basis weight of the support substrate is preferably from 45 to 290 g/m².

Surface Layer

The surface layer contains a pigment and a binder, and optionally contains a surfactant and other components, as necessary.

Examples of the pigment include inorganic pigments and combinations of inorganic and organic pigments. Specific examples of the inorganic pigments include, but are not limited to, kaolin, talc, ground calcium carbonate, precipitated calcium carbonate, calcium sulfite, amorphous silica, titanium white, magnesium carbonate, titanium dioxide, aluminum hydroxide, calcium hydroxide, magnesium hydroxide, zinc hydroxide, and chlorite. Preferably, the amount of the inorganic pigment added to 100 parts by mass of the binder is 50 parts by mass or more.

Specific examples of the organic pigments include, but are not limited to, water-soluble dispersions of styrene-acrylic copolymer particles, styrene-butadiene copolymer particles, polystyrene particles, and polyethylene particles. Preferably, the amount of the organic pigment added to 100 parts by mass of all the pigments in the surface layer is from 2 to 20 parts by mass.

Preferably, the binder comprises a water-based resin. As the water-based resin, at least one of a water-soluble resin and a water-dispersible resin is preferably used. The water-soluble resin is not particularly limited and can be suitably selected to suit to a particular application. Examples thereof include, but are not limited to, polyvinyl alcohol, cation-modified polyvinyl alcohol, acetal-modified polyvinyl alcohol, polyester, polyurethane, and polyester-polyurethane copolymer.

The surfactant contained in the surface layer as needed is not particularly limited and can be suitably selected to suit to a particular application. Examples thereof include anionic surfactants, cationic surfactants, ampholytic surfactants, and nonionic surfactants.

A method for forming the surface layer is not particularly limited and can be suitably selected to suit to a particular application. Examples thereof include, but are not limited to, a method of impregnating or coating the support substrate with a surface layer constituting liquid. The adhered amount of the surface layer constituting liquid is not particularly limited and can be suitably selected to suit to a particular application, but is preferably from 0.5 to 20 g/m², more preferably from 1 to 15 g/m², on solid basis.

EXAMPLES

Further understanding of the present disclosure can be obtained by reference to certain specific examples provided herein below for the purpose of illustration only and are not intended to be limiting.

Preparation Example of Black Pigment Dispersion

First, 20 g of a carbon black (NIPEX 160 manufactured by Degussa AG, having a BET specific surface area of 150 m²/g, an average primary particle diameter of 20 nm, a pH of 4.0, and a DBP oil absorption of 620 g/100 g), 20 mmol of a compound represented by the following structural formula (1), and 200 mL of ion-exchange high-purity water were mixed by a Silverson mixer at a revolution of 6,000 rpm at room temperature.

In a case in which the pH of the resulting slurry was higher than 4, 20 mmol of nitric acid was added thereto. Thirty minutes later, 20 mmol of sodium nitrite dissolved in a small amount of ion-exchange high-purity water was gently added to the above mixture. The mixture was further heated to 60 degrees C. while being stirred, then subjected to a reaction for 1 hour. As a result, a modified pigment in which the compound represented by the following structural formula (1) was adducted to carbon black was produced.

Next, the pH was adjusted to 10 by adding an NaOH aqueous solution, thus obtaining a modified pigment dispersion 30 minutes later. The modified pigment dispersion, containing the pigment bonded to at least one geminal bisphosphonic acid group or sodium geminal bisphosphonate, was subjected to ultrafiltration using ion-exchange high-purity water and a dialysis membrane and thereafter to ultrasonic dispersion. As a result, a self-dispersing black pigment dispersion having a solid pigment content concentration of 16% by mass was obtained. Here, the self-dispersing black pigment had bisphosphonate group as a hydrophilic functional group.

[Chem. 1]

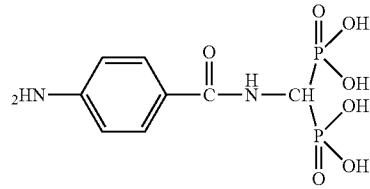

Structural Formula (1)

Preparation Example of Liquid Composition 1 (Ink)

A liquid composition 1 (ink) was prepared by mixing 50.00% by mass of the black pigment dispersion (having a solid pigment content concentration of 16%), 2.22% by mass of a polyethylene wax AQUACER 531 (containing 45% by mass of non-volatile contents, manufactured by BYK Japan KK), 30.00% by mass of 3-ethyl-3-hydroxymethyloxetane, 10.0% by mass of propylene glycol monopropyl ether, 2.00% by mass of a silicone-based surfactant (TEGO Wet 270, manufactured by Tomoe Engineering Co., Ltd.), and ion-exchange water in a balanced amount, then stirring the mixture for 1 hour, and filtering the mixture with a membrane filter having an average pore diameter of 1.2 µm.

Preparation Example of Liquid Composition 2 (Aftertreatment Liquid)

A liquid composition 2 (aftertreatment liquid) was prepared by mixing 22 parts of 1,3-butanediol, 11 parts of glycerin, 15 parts of a polyurethane emulsion SUPERFLEX 210 (manufactured by DKS Co. Ltd.) having a solid content concentration of 35% by mass, 2 parts of 2-ethyl-1,3-hexanediol, 0.05 parts of a fluorine-based nonionic surfactant CAPSTONE (registered trademark) FS-3100 (manufactured by DuPont de Nemours, Inc.), 0.1 parts of 2,4,7,9-tetramethyl-4,7-decanediol, 0.2 parts of a preservative and fungicide PROXEL LV (manufactured by AVECIA GROUP), 10 parts of a polyethylene wax POLYRON P502 (manufactured by Chukyo Yushi Co., Ltd.) having a solid content concentration of 30% by mass, and 39.65 parts of water.

Example 1

Preparation of Contacting Member

To the surface of an aluminum hollow roller having a diameter of 75 mm (available from MISUMI Group Inc.) serving as a substrate, TOMY FILEC PASLH (monofilament, manufactured by TOMOEGAWA CO., LTD.) serving as a fluororesin fiber was attached via an adhesive layer formed by applying a silicone-based adhesive. After the adhesive had been cured, the roller around which the fluororesin fiber was wound was rotated twice at a rotation speed of 10 seconds/round while applying a linear pressure of 50 kg/cm using a pressing jig composed of three stainless-steel rollers. Thus, a contacting member 1 having a fluororesin fiber layer was prepared.

Presence Ratios X and Y of Fluororesin Fiber

The fiber layer was cut perpendicularly to the surface direction of the fiber layer to form a cross section. Next, this cross section was subjected to mapping of fluorine component. The mapping of fluorine component was performed by an EDS (Energy Dispersive X-ray Spectroscopy) elemental analyzer (Phenom ProX available from Thermo Fisher Scientific Inc.). Based on the obtained data, the ratio of the area of a portion where fluorine component was present to the area of a portion where no fluorine component was present was calculated by the ProSuite software. Of the calculated ratios, the ratio in the impregnated portion was defined as the presence ratio X, and the ratio in the non-impregnated portion was defined as the presence ratio Y. From the calculated presence ratio X and presence ratio Y, the ratio X/Y was determined. In calculating the presence ratio X and the presence ratio Y, the average value of values measured at 5 positions within a measurement area of 100 µm×100 µm was used. The results are presented in Table 1.

Thickness of Fiber Layer

The thickness of the above-prepared contacting member was measured using a confocal microscope LEXT (manufactured by Olympus Corporation). Specifically, first, the fiber layer was separated from the substrate by dissolving the adhesive member in the fiber layer in toluene (Wako special grade). Next, the separated fiber layer was cut perpendicularly to the surface direction of the fiber layer to form a cross section. The average value of thickness values measured at 10 points on the cross section was employed as the thickness of the fiber layer. The results are presented in Table 1.

Air Permeability of Fiber Layer

The air permeability of the fiber layer was measured by a Gurley automatic air permeability meter (manufactured by Emo) according to a method based on ISO5636. Specifically, first, the fiber layer was separated from the substrate by dissolving the adhesive member in the fiber layer in toluene (Wako special grade). Next, the time required for 300 ml of air to pass through the separated fiber layer with respect to a passage diameter of 10 mm was measured. The measurement was performed at 10 different positions, and the average value was defined as the air permeability. The results are presented in Table 1.

Printing by Printing Apparatus Incorporating Contacting Member

An inkjet printing system (RICOH Pro VC60000, manufactured by Ricoh Co., Ltd.) was modified to incorporate the above-prepared contacting member, and an image was printed on a recording medium serving as a contacted member. The contacting member was incorporated in a position that is downstream of the drying device that dries the applied liquid composition 1 (ink) and liquid composition 2 (aftertreatment liquid) in the conveyance direction of the contacted member in the conveyance path in the printing apparatus, which first comes into direct contact with the region to which the liquid composition 1 (ink) and the liquid composition 2 (aftertreatment liquid) had been applied. As the recording medium, a rolled sheet LUMI ART GLOSS 130 gsm (manufactured by Stora Enso, having a sheet width of 520.7 mm) and another rolled sheet obtained by cutting this rolled sheet so that the sheet width became ¼ were used. In the first step, the rolled sheet with the ¼ sheet width was set in the modified machine and conveyed for 15 km at a speed of 50 m/min. In the second step, a solid image was printed with the liquid composition 1 (ink) on the uncut rolled sheet at a resolution of 1,200 dpi, and another solid image was immediately thereafter printed with the liquid composition 2 (aftertreatment liquid) on the liquid composition 1 (ink). At the time of printing in the second step, the solid image formed by the liquid composition 1 (ink) and the liquid composition 2 (aftertreatment liquid) was conveyed in contact with the boundary on the contacting member between a region to which the rolled sheet had been conveyed in the first step and another position to which the rolled sheet had not been conveyed.

Examples 2 to 16 and Comparative Examples 1 to 11

In each of Examples 2 to 16 and Comparative Examples 1 to 11, the procedures in Example 1 were repeated except for changing, according to Table 1, the diameter of the hollow roller as the substrate, the type of fiber used for the fiber layer, the linear pressure applied to the roller to which the fiber layer was wound and the adhesive had been cured, and the winding ratio of the recording medium with respect to the contacting member incorporated in the printing apparatus.

In Comparative Examples 7 to 11, the fiber layer before being attached to the substrate was subjected to a process in which the fiber layer was sandwiched by a high-speed calendering device (manufactured by YURI ROLL Co., Ltd.) at a linear pressure of 20 kg/cm and a speed of 1 m/min.

The product names and manufacturers of the fiber layer materials described in Table 1 are as follows.
 TOMY FILEC PA5LH (fluororesin fiber, monofilament, manufactured by TOMOEGAWA CO., LTD.)
 TOMY FILEC PA10LH (fluororesin fiber, monofilament, manufactured by TOMOEGAWA CO., LTD.)
 TOYOFLON 406D (fluororesin fiber, multifilament, manufactured by Toray Industries, Inc.)
 TOYOFLON 2402 (fluororesin fiber, multifilament, manufactured by Toray Industries, Inc.)
 TOYOFLON FP002CD (fluororesin fiber, multifilament, manufactured by Toray Industries, Inc.)
 TOYOFLON T33R (fluororesin fiber, multifilament, manufactured by Toray Industries, Inc.)
 TOYOFLON BF-800S (fluororesin fiber, multifilament, manufactured by Toray Industries, Inc.)

Image Detachability

In the above Examples and Comparative Examples, solid image detachability was evaluated. Specifically, the solid image portion formed by the operations described in "Printing by Printing Apparatus incorporating Contacting Member" above was visually observed from a distance of 300 mm. More specifically, a 25 mm square area was arbitrarily specified in the solid image portion that had passed through the boundary on the contacting member between the region where the rolled sheet with a small width had been conveyed and the region where the rolled sheet had not been conveyed, and the number of points where the solid image was detached off within the specified area was counted. Image detachability was evaluated based on the following evaluation criteria. The results are presented in Table 1. The ranks A, B, and C are evaluated as being practically usable.

Evaluation Criteria

A: The number of points where image detachment occurred is 2 or less.
B: The number of points where image detachment occurred is from 3 to 6.
C: The number of points where image detachment occurred is from 7 to 11.
D: The number of points where image detachment occurred is 12 or more.

Fiber Layer Detachability

In the above Examples and Comparative Examples, fiber layer detachability was evaluated. Specifically, a razor was vertically applied to the fiber layer disposed on the contacting member to make a cut so as to surround a region (evaluation region) having a width of 30 mm and a length of 100 mm. Next, the end portion of the evaluation area on the short-width side was grasped, and a 90° detachment stress was measured using a digital force gauge (available from A&D Company, Limited) at a speed of 100 mm/5 seconds. The maximum value within a measurement distance of 100 mm was employed as the measurement value. In this measurement, 3 evaluation regions with different positions were created, and the average value of values measured in respective regions was employed. The results are presented in Table 1. The measurement values being 7 N/cm or higher are evaluated as being practically usable.

TABLE 1

| | | Conditions | | | | | | | Evaluation Results | | |
|---|---|---|---|---|---|---|---|---|---|---|---|
| | | Linear Pressure in Calendaring Processing | Linear Pressure Applied after | Presence Ratio of Fiber X/Y | Thickness of Fiber | Air Permeability of Fiber | Roller | | Image Detachability | | Fiber Layer |
| | | before | Curing of | (Fixed Side/ | Layer | Layer | Diameter | Winding | Number of | | Detach- |
| | Fiber Layer Material | Attaching (kg/cm) | Adhesive (kg/cm) | Contact Side) | (μm) | (sec) | (mm) | Ratio (%) | Detachments | Rank | ability |
| Ex 1 | TOMY FILEC PA5LH | 0 (No Processing) | 50.0 | 0.30 | 320 | 9 | 75 | 50 | 6 | B | 7 |
| Ex 2 | TOMY FILEC PA5LH | 0 (No Processing) | 100.0 | 0.20 | 290 | 15 | 75 | 50 | 7 | C | 8 |
| Ex 3 | TOMY FILEC PA10LH | 0 (No Processing) | 50.0 | 0.33 | 630 | 14 | 75 | 50 | 4 | B | 7 |
| Ex 4 | TOMY FILEC PA10LH | 0 (No Processing) | 100.0 | 0.20 | 370 | 20 | 75 | 50 | 4 | B | 7 |
| Ex 5 | TOMY FILEC PA10LH | 0 (No Processing) | 150.0 | 0.10 | 310 | 22 | 75 | 50 | 4 | B | 7 |
| Ex 6 | TOMY FILEC PA10LH | 0 (No Processing) | 50.0 | 0.33 | 630 | 14 | 75 | 25 | 1 | A | 7 |
| Ex 7 | TOMY FILEC PA10LH | 0 (No Processing) | 50.0 | 0.33 | 630 | 14 | 75 | 90 | 2 | A | 7 |
| Ex 8 | TOMY FILEC | 0 | 50.0 | 0.33 | 630 | 14 | 75 | 40 | 1 | A | 7 |

TABLE 1-continued

| | | Conditions | | | | | | | | | |
|---|---|---|---|---|---|---|---|---|---|---|---|
| | | Linear Pressure in Calendaring Processing before Attaching | Linear Pressure Applied after Curing of Adhesive | Presence Ratio of Fiber X/Y (Fixed Side/ Contact Side) | Thickness of Fiber Layer (μm) | Air Permeability of Fiber Layer (sec) | Roller | | Evaluation Results | | |
| | Fiber Layer Material | (kg/cm) | (kg/cm) | | | | Diameter (mm) | Winding Ratio (%) | Image Detachability | | Fiber Layer Detachability |
| | | | | | | | | | Number of Detachments | Rank | |
| Ex 9 | PA10LH TOMY FILEC | (No Processing) 0 | 50.0 | 0.33 | 630 | 14 | 75 | 80 | 2 | A | 7 |
| Ex 10 | PA10LH TOMY FILEC | (No Processing) 0 | 50.0 | 0.33 | 630 | 14 | 50 | 50 | 0 | A | 7 |
| Ex 11 | PA10LH TOMY FILEC | (No Processing) 0 | 50.0 | 0.33 | 630 | 14 | 60 | 50 | 0 | A | 7 |
| Ex 12 | PA10LH TOMY FILEC | (No Processing) 0 | 50.0 | 0.33 | 630 | 14 | 90 | 50 | 0 | A | 7 |
| Ex 13 | PA10LH TOMY FILEC | (No Processing) 0 | 50.0 | 0.33 | 630 | 14 | 100 | 50 | 0 | A | 7 |
| Ex 14 | TOYOFLON 406D | (No Processing) 0 | 50.0 | 0.80 | 320 | 3 | 75 | 50 | 6 | B | 7 |
| Ex 15 | TOYOFLON 2402 | (No Processing) 0 | 50.0 | 0.90 | 200 | 3 | 75 | 50 | 11 | C | 7 |
| Ex 16 | TOYOFLON BF-800S | (No Processing) 0 | 50.0 | 0.33 | 800 | 3 | 75 | 50 | 4 | B | 7 |
| Comp Ex 1 | TOMY FILEC PA5LH | (No Processing) 0 | 0.0 | 1.00 | 500 | 8 | 75 | 50 | 14 | D | 7 |
| Comp Ex 2 | TOMY FILEC PA10LH | (No Processing) 0 | 0.0 | 1.00 | 900 | 12 | 75 | 50 | 14 | D | 7 |
| Comp Ex 3 | TOYOFLON 406D | (No Processing) 0 | 0.0 | 1.00 | 900 | 3 | 75 | 50 | 17 | D | 7 |
| Comp Ex 4 | TOYOFLON 2402 | (No Processing) 0 | 0.0 | 1.00 | 290 | 3 | 75 | 50 | 17 | D | 7 |
| Comp Ex 5 | TOYOFLON FP002CD | (No Processing) 0 | 0.0 | 1.00 | 900 | 3 | 75 | 50 | 22 | D | 7 |
| Comp Ex 6 | TOYOFLON 133R | (No Processing) 0 | 0.0 | 1.00 | 900 | 3 | 75 | 50 | 19 | D | 7 |
| Comp Ex 7 | TOMY FILEC PA5LH | 20.0 | 0.0 | 1.00 | 500 | 12 | 75 | 50 | 1 | A | 2 |
| Comp Ex 8 | TOMY FILEC PA10LH | 20.0 | 0.0 | 1.00 | 900 | 18 | 75 | 50 | 2 | A | 2 |
| Comp Ex 9 | TOYOFLON 406D | 20.0 | 0.0 | 1.00 | 410 | 3 | 75 | 50 | 1 | A | 2 |
| Comp Ex 10 | TOYOFLON 2402 | 20.0 | 0.0 | 1.00 | 230 | 3 | 75 | 50 | 2 | A | 3 |
| Comp Ex 11 | TOYOFLON BF-800S | 20.0 | 0.0 | 1.00 | 1300 | 3 | 75 | 50 | 0 | A | 2 |

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2019-050260, filed on Mar. 18, 2019, in the Japan Patent Office, the entire disclosure of which is hereby incorporated by reference herein.

REFERENCE SIGNS LIST

1 Contacted member feeder
2 Liquid composition applicator
3 Liquid composition heater
4 Contacting member
5 Contacting member heater
6 Contacted member collector
7 Contacted member
8 Conveyance path
9a, 9b End portions at each of which the contacted member separates from the contacting member
10 Contacting member
10a, 10b Minute steps
11 Contacted member
12 Contacted member
13 Abnormal image
20 Cantilever
21 Probe
30 Substrate
31 Adhesive layer
32 Adhesive impregnated region
33 Adhesive non-impregnated region
34 Impregnated portion
35 Non-impregnated portion
50 Drying device
100 Printing apparatus

The invention claimed is:

1. A contacting member that contacts a region of a contacted member to which a liquid composition has been applied, comprising:
a substrate; and a fluororesin fiber layer containing a fluororesin fiber,
wherein one side of the fluororesin fiber layer is directly or indirectly fixed to the substrate and another side of the fluororesin fiber layer contacts the contacted member,
wherein a ratio X/Y is greater than or equal to 0.3 and less than 1.00, wherein X is a presence ratio of the fluororesin fiber in the fluororesin fiber layer on the side which is directly or indirectly fixed to the substrate and Y is a presence ratio of the fluororesin fiber in the fluororesin fiber layer on the other side which contacts the contacted member,
and wherein the contacted member is a recording medium.

2. The contacting member according to claim 1,
wherein the fluororesin fiber layer is directly or indirectly fixed to the substrate with an adhesive member,
wherein the fluororesin fiber layer has an impregnated portion impregnated with the adhesive member and a non-impregnated portion not impregnated with the adhesive member.

3. The contacting member according to claim 2,
wherein the presence ratio X is a presence ratio of the fluororesin fiber in the impregnated portion,
wherein the presence ratio Y is a presence ratio of the fluororesin fiber in the non-impregnated portion.

4. The contacting member according to claim 1, wherein the ratio X/Y is from 0.3 to 0.8.

5. The contacting member according to claim 1, wherein the fluororesin fiber layer has a thickness of from 300 to 700 μm.

6. The contacting member according to claim 1, wherein the fluororesin fiber layer has an air permeability of from 4 to 16 seconds.

7. The contacting member according to claim 1, wherein the substrate is in a roller shape having a diameter of from 50 to 100 mm.

8. A drying device that dries a contacted member to which a liquid composition has been applied, comprising:
the contacting member according to claim 1.

9. The drying device according to claim 8, further comprising:
a liquid composition heater configured to heat the liquid composition applied to the contacted member from a back side of a surface of the contacted member having the region.

10. A printing apparatus comprising:
a liquid composition applicator configured to apply a liquid composition to a contacted member;
a conveyance path through which the contacted member to which the liquid composition has been applied passes; and
the contacting member according to claim 1, the contacting member disposed in the conveyance path so as to come into contact with the region of the contacted member.

11. The contacting member according to claim 1, wherein a detachment force required to detach the fluororesin fiber layer from the substrate is 7 N/cm or more.

12. The contacting member according to claim 1, wherein the fluororesin fiber layer and the substrate are integrated by heat fusion.

13. The contacting member according to claim 2, wherein the adhesive member is silicone-based.

14. The contacting member according to claim 1, wherein the wherein the substrate is a roller-shaped body.

15. The contacting member according to claim 1, wherein the contacting member is configured to be disposed in a conveyance path of a printing apparatus so as to come into contact with the region of the contacted member,
the printing apparatus comprising a liquid composition applicator configured to apply a liquid composition to the contacted member, and
the conveyance path through which the contacted member to which the liquid composition has been applied passes.

16. The printing apparatus according to claim 10, wherein the substrate is in a roller shape having a diameter of from 50 to 100 mm.

17. The printing apparatus according to claim 10, wherein the ratio X/Y is from 0.3 to 0.8.

18. The printing apparatus according to claim 10, wherein the fluororesin fiber layer has a thickness of from 300 to 700 μm.

19. A contacting member that contacts a region of a contacted member to which a liquid composition has been applied, comprising:
a substrate; and
a fluororesin fiber layer containing a fluororesin fiber,
wherein one side of the fluororesin fiber layer is directly or indirectly fixed to the substrate and another side of the fluororesin fiber layer contacts the contacted member,
wherein a ratio X/Y less than 1.00, wherein X is a presence ratio of the fluororesin fiber in the fluororesin fiber layer on the side which is directly or indirectly fixed to the substrate and Y is a presence ratio of the fluororesin fiber in the fluororesin fiber layer on the other side which contacts the contacted member,
wherein the fluororesin fiber layer has a thickness of from 300 to 700 μm.

* * * * *